Oct. 15, 1957 G. ZINT 2,809,737
PRINTING AND SPACING MECHANISM FOR TYPEWRITERS
WRITING CONTINUOUSLY IN OPPOSITE DIRECTIONS
Filed Dec. 13, 1955 9 Sheets-Sheet 1

INVENTOR
GEORGE ZINT

BY
ATTORNEYS

Oct. 15, 1957 G. ZINT 2,809,737
PRINTING AND SPACING MECHANISM FOR TYPEWRITERS
WRITING CONTINUOUSLY IN OPPOSITE DIRECTIONS
Filed Dec. 13, 1955 9 Sheets-Sheet 2

FIG. 2

INVENTOR
GEORGE ZINT
BY
ATTORNEYS

FIG. 3

Oct. 15, 1957 G. ZINT 2,809,737
PRINTING AND SPACING MECHANISM FOR TYPEWRITERS
WRITING CONTINUOUSLY IN OPPOSITE DIRECTIONS
Filed Dec. 13, 1955 9 Sheets-Sheet 4

GNOL A SIT«
»»TIS A LAST»»TIS A BEAUTIFUL RE
HT MORF ENOG SAH WORROS NEHW«TS
E BROW AND THE BREAST»»WE ARE
HW«PEELS«EHT«PEELS«EHT NEVIG
ICH WE CRAVE»»THE LAST LONG»»S
.EVARG EHT FO«PEELS EHT«PEEL

FIG. 5

INVENTOR
GEORGE ZINT

BY *[signature]*
ATTORNEYS

FIG. 9

INVENTOR
GEORGE ZINT

BY
ATTORNEYS

INVENTOR
GEORGE ZINT

Oct. 15, 1957 G. ZINT 2,809,737
PRINTING AND SPACING MECHANISM FOR TYPEWRITERS
WRITING CONTINUOUSLY IN OPPOSITE DIRECTIONS
Filed Dec. 13, 1955 9 Sheets-Sheet 8

INVENTOR
GEORGE ZINT

BY *NB Wilson & Co.*
ATTORNEYS

United States Patent Office 2,809,737
Patented Oct. 15, 1957

2,809,737

PRINTING AND SPACING MECHANISM FOR TYPEWRITERS WRITING CONTINUOUSLY IN OPPOSITE DIRECTIONS

George Zint, Wapakoneta, Ohio

Application December 13, 1955, Serial No. 552,959

15 Claims. (Cl. 197—84)

This invention relates to typewriters.

In my Patent No. 2,578,771, December 18, 1951, Typewriter for Writing Continuously in Opposite Directions, the carriage is power driven at a constant speed in opposite directions and at the end of each line of typed matter the platen is automatically turned for line spacing, so that all the user of the machine has to do is to insert and remove the paper and to strike the keys in predetermined timed relation. Since the typing is done during each stroke of the carriage, every other line of typed matter must be read backward or from right-to-left. Such typed matter is difficult to read, and one object of the invention is to facilitate the reading by providing in such a machine, means whereby the user may type at the ends of sentences, or at the ends of lines or elsewhere, arrow-like symbols which indicate the directions in which the lines are to be read.

In the improved machine two printing levers, which type oppositely pointing arrows and which are similar to the ordinary character printing levers operated by the key levers of the machine, are mounted at the inner ends of the two banks of type-carrying or character printing levers, and a single finger-operated element is provided to operate either one or the other of the arrow printing levers depending upon the direction of travel of the carriage. Another object of the invention is to provide in a machine of this character automatic means operated at each end of travel of the carriage, to cause the single finger or thumb operated element to actuate the proper arrow printing lever so that the printed arrows will point in the direction in which the line of type characters is typed, and hence is to be read.

In my Patent No. 2,701,632, February 8, 1955, Variable Spacing Feed Mechanism for Typewriters and Other Machines, there is disclosed improvements in the typewriter of the first mentioned patent, dealing particularly with the spacing of the typed letters or characters. In this later patented machine the motor driven carriage, instead of being moved in opposite directions at a constant speed, is moved intermittently under manual control, the ordinary key levers and space bar being used to control the carriage feed and hence the spacing of the typed characters between the letters of words and the ends of sentences. In the present invention the same manually controlled spacing by the key levers is employed but the spacing by the usual space bar is discarded, and in its place is employed a finger actuated element which is used to space words and sentences and which is preferably in the form of a ring or loop to receive the left thumb of the operator. Thus, the spacing between words and sentences is done by movement of the thumb of the left hand in depressing that loop instead of actuating the usual space bar. Another object is therefore to simplify the spacing mechanism of my Patent No. 2,701,632.

The first mentioned finger operated element which causes the actuation of the proper arrow typing lever, is also preferably in the form of a ring or loop to receive the thumb of the right hand of the operator. These two thumb rings also serve the further function of properly positioning the two hands of the operator relative to the keyboard of the machine, since the two thumb rings are so mounted on the front of the main frame of the typewriter, that when the thumbs are in them the fingers of both hands may reach and operate the usual key levers.

With the above and other objects and advantages in view, the invention resides in the novel combinations and arrangements of parts and the novel features of construction hereinafter described and claimed, and illustrated in the accompanying drawings which show the present preferred embodiment of the invention.

In the embodiment of this invention shown in the drawings many of the parts are the same in construction and operation at the corresponding parts in the two above mentioned patents, and in the following description those parts will bear the same reference numerals as used in said patents. However as above indicated, the present invention contemplates means for correctly positioning the hands of the operator relative to the key levers of a typewriter, such means being two elements located at the front of the keyboard to be engaged by the thumbs and preferably in the form of rings or loops, and the use of one of the thumb engaging elements to take the place of the space bar 273 in a machine such as disclosed in Patent No. 2,701,632, and the use of the other of the thumb engaging elements to operate one or the other of two arrow printing levers, depending upon the direction of travel of the carriage in a mechanism such as disclosed in Patent No. 2,578,771.

In the drawings 24 indicates in broken lines the main frame of a typewriter such as a No. 9 Oliver. Fixed to the rear of the main frame is a sub-frame 20 carrying a transverse bar 25 which has at one end a forwardly extending arm 121. 99 denotes part of a sliding carriage carrying a rotary platen 101 with a squared extension shaft 110 at one end. Carried by the center of the carriage is a traveling nut member 80 mounted on a duplex or cross screw 62 driven by an electric motor 37 through parts of the intermittent drive mechanism of Patent No. 2,701,632. The shaft of the screw is supported from the frame 20 and the motor and drive parts are supported from the bar 25. The motor shaft is constantly rotated and carries a toothed head to pick up one of an annular series of slidable pins on a head fixed to the shaft of the screw. Associated with the toothed head is a stationary cam which coacts with spring pressed plungers fixed to the pins. The cam has a high portion which causes the plungers to hold their pins retracted, and a low portion which permits one pin at a time to be driven through a part of a revolution of the driving tooth and hence the screw shaft will be continuously rotated unless a plunger approaching the low portion of the cam is prevented from moving its pin into the path of the driving tooth. To do that and hence cause an intermittent rotation of the screw, a manually controlled gate 255 is provided in a support 256 adjacent the cam. The control gate slides radially into and out of the path of movement of the plungers at the low portion of the cam. The gate is moved inward by a spring 258 and is retracted by a wedge 260 engaging a pin 261 on the gate. The wedge is moved by an upright rod 263. For a more detailed showing of the intermittent drive reference may be had to Patent No. 2,701,632.

Figure 3:
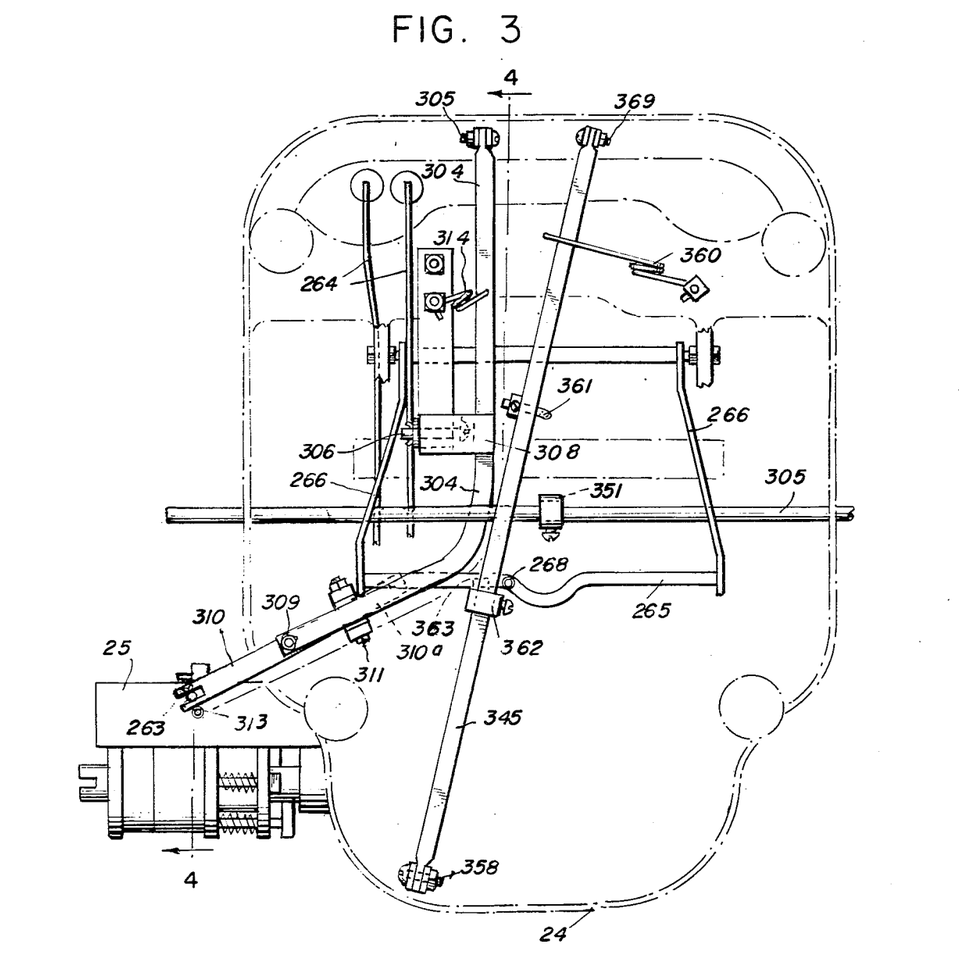
Fig. 3 is a somewhat diagrammatic bottom plan view of parts of the machine to show the parts actuated by the two depressible thumb rings.
Figures 4, 19:
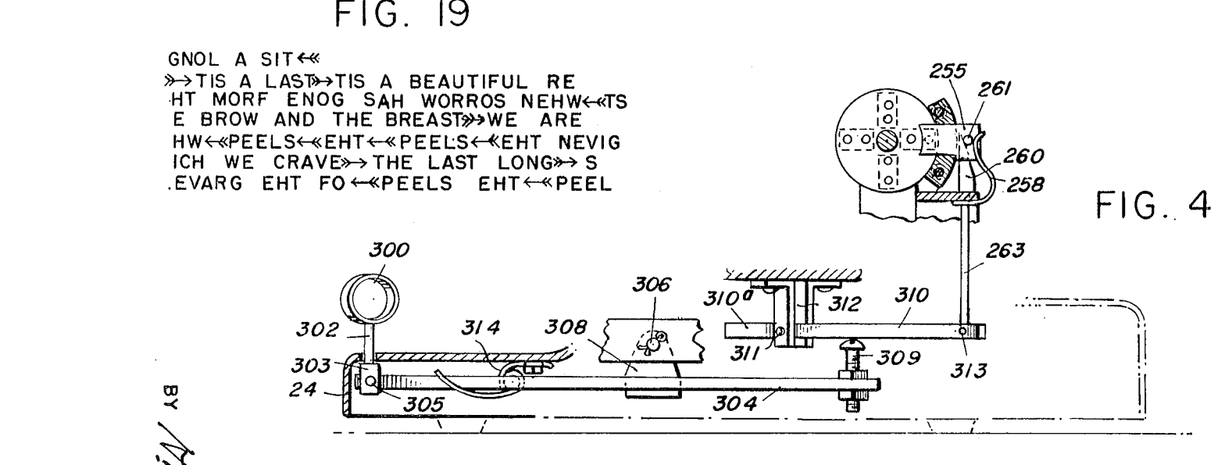
Fig. 4 is a detail vertical section taken substantially on the line 4—4 in Fig. 3 to show how one of the thumb rings operates the slidable wedge associated with the control gate.
Fig. 19 shows an example of typed matter written on the machine.
Figure 5:
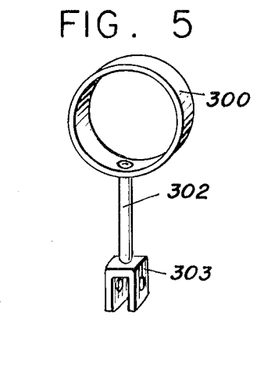
Fig. 5 is a detail perspective view of one of the thumb rings.

Mounted near the center of the front of the frame 24 are two horizontally spaced thumb engaging elements 300 and 301. They may be variously constructed and mounted so long as they position the thumbs so that the fingers of the hands may reach all of the keys of the keyboard when the thumbs are engaged with these elements. The elements are preferably in the form of loops of a size to receive the end portions of the thumbs so that the latter will not readily slip off of them, and as shown, they are circular rings. In the disclosed machine the ring 300 is adapted to be depressed to operate the wedge 260, as shown in Figs. 3 and 4, while the ring 301 is similarly movable to cause the operation of one of the arrow printing levers as hereinafter described. When thus mounted each ring is fixed to an upright cylindrical stem 302 loosely slidable in a vertical opening in the front of the frame 24 and having fixed to its lower end a forked head 303. This head of the ring 300 loosely receives the front end of a lever 304 which is pivoted to it by a bolt or other pivot 305. The thumb ring has a very limited turning and swinging movement. The lever is of angular shape, as seen in Fig. 3, and is fulcrumed between its ends on a pivot 306 mounted in a part of the main frame and supporting a bracket 308 which is fixed to the lever. At the rear end of the lever is an upright adjustable stud 309 which may be a bolt passing through a hole in the lever and held in an adjusted position by nuts on its threaded portion. The stud or bolt 309 thrusts against the under face of a short lever 310 pivoted between its ends on a pivot 311 in a bracket 312 fixed to an under part of the frame as seen in Fig. 4. The rear end of this lever is pivoted at 313 to the rod 263 of the wedge 260. A coil spring 314 fixed at one end to the underside of the frame has its free end thrusting against the bottom of the front portion of the lever 304 to cause the ring 300 to be elevated and permitting the rear end of the lever 310 to lower and retract the wedge 260. Thus when the thumb piece or ring 300 is depressed, the stud 309 will swing the connected end of the lever 310 upwardly and cause the wedge to move the gate 255 out of the path of the approaching stud so that its pin will be picked up by the driving tooth to give the screw 62 a partial rotation sufficient to move the carriage the proper distance for letter or character spacing. If the ring 300 is held depressed the screw will continue to rotate and thus lengthen the spacing. The lever 310 corresponds to the lever 270 in Patent No. 2,701,632, and each time a key lever of the typewriter is depressed and released the rod 263 will be operated to momentarily retract the gate so that the letters of a word will be spaced. As shown in Fig. 3, the conventionally represented key levers 264 overlie the usual cross portion 265 of a pivoted spring pressed U-shaped member 266 so that each time a key lever is depressed the member 266 is depressed against the tension of its spring 268. The cross portion or bar 265 overlies the rear end 310ᵃ of the lever 310 and hence when the member 266 is depressed it will operate that lever to lift the rod 263 and its wedge 260.

The key levers 264 are connected to operate type levers 316 of substantially U-shape mounted in two banks or groups on stationary supports 317. These old parts are only partially and diagrammatically shown, as is also an old ribbon shift mechanism that includes guide loops 318 for the ribbon R on the rear end of a shiftable member 319 which is operated each time a key is struck and each time the ring 301 is depressed to operate one or the other of the arrow printing levers. The ribbon shift member 319 is pivotally supported between its ends on the top of an arm 320 on a rock shaft mounted on an upright stationary support 321, the shaft having a crank at one end. A link 323 parallel with the arm 320 and pivotally connected between the front end of the member 319 and a bracket on the support 321 causes the member to shift in a forward and rearward substantially horizonal plane when the crank is operated. The crank is connected to the upper end of a link, the lower end of which is connected to a forwardly and rearwardly extending lever which tilts each time the member 266 is operated. Only portions of this old ribbon shift mechanism are diagrammatically represented in Figs. 1, 16 and 18, since this mechanism forms no part of the present invention.

Figures 1, 15:
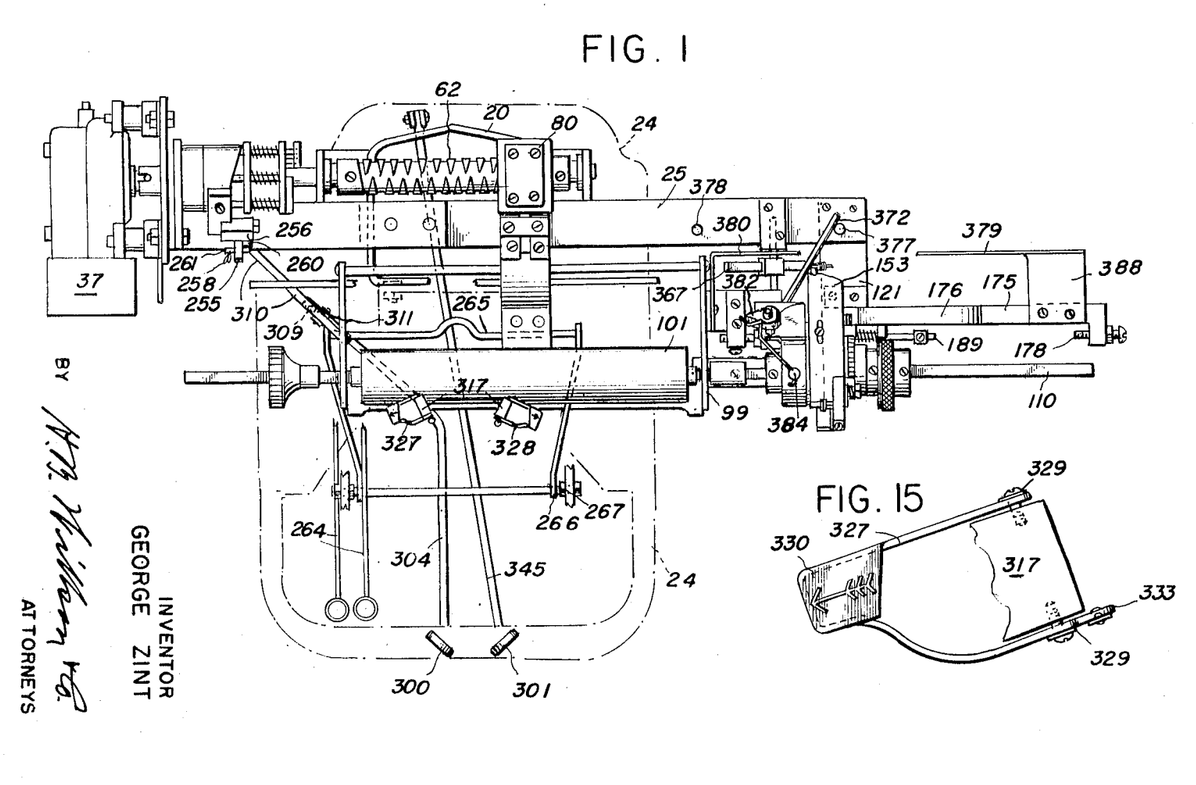
Fig. 1 is a top plan view of a typewriter of the character shown in the above mentioned patents with the present invention applied thereto, parts of the old typewriter mechanism being omitted and parts being shown in dotted lines.
Fig. 15 is a plan view of one of the arrow printing levers.
Figure 2:
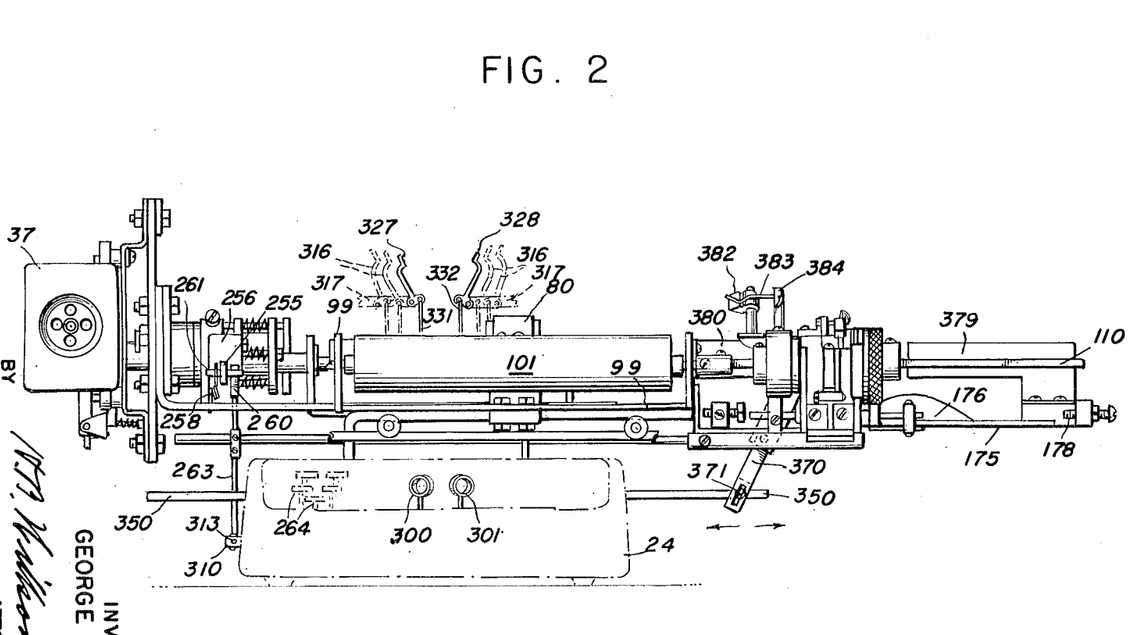
Fig. 2 is a front elevation of most of the machine shown in Fig. 1.

Mounted at the inner ends of the two banks of character printing or type levers 316 are the two arrow printing levers 327 and 328 one of which is shown in Fig 15. These new levers are similar to the old levers 316 and are of substantially U-shape having their spaced arms pivoted at 329 on one of the supports 317. At their free ends are type blocks or plates 330 which print an arrow or any equivalent symbol. The arrows printed by the two levers point in opposite directions. The levers 327 and 328 are operated respectively by upright links 331 and 332 whose upper ends are pivoted to the front arms of the levers eccentrically of the pivots which support said levers, and preferably to short laterally projecting ears 333 on the lever arms.

Figures 16, 17:
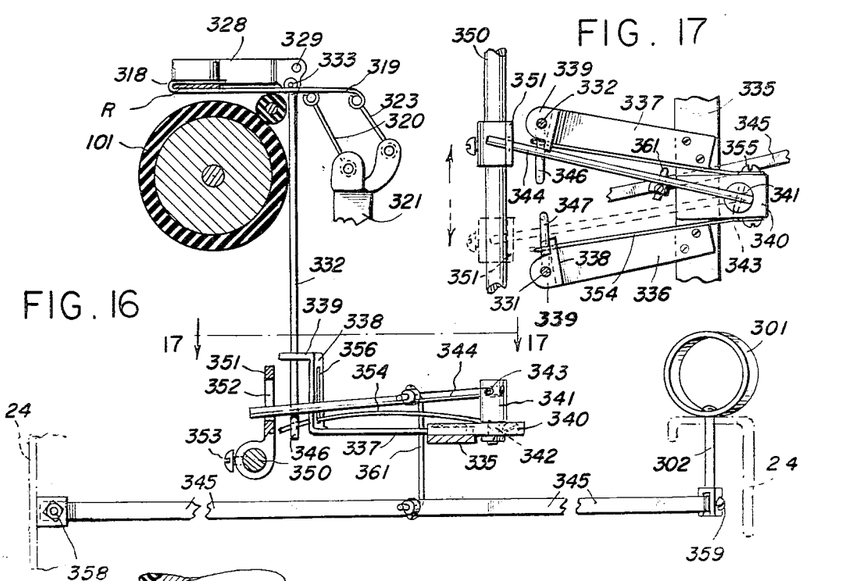
Fig. 16 is a somewhat diagrammatic vertical sectional view showing the means for selectively actuating one or the other of the two arrow printing levers.
Fig. 17 is a detail horizontal sectional view taken on the line 17—17 in Fig. 16.
Figure 18:
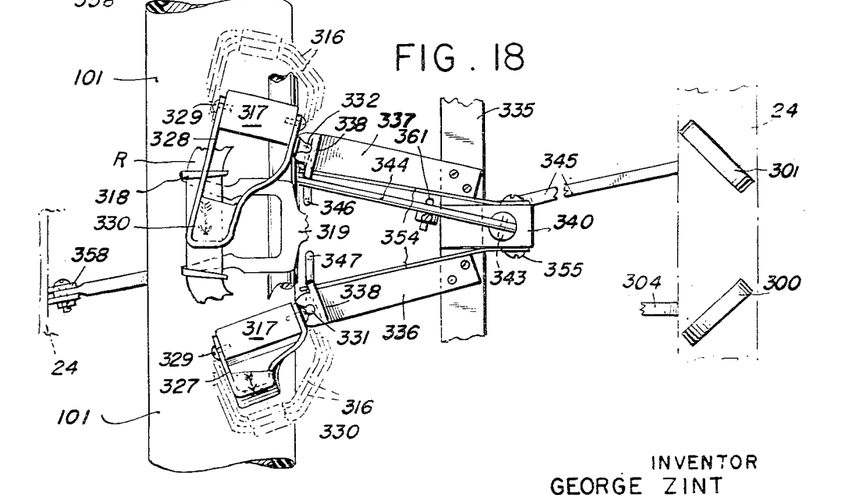
Fig. 18 is a somewhat diagrammatical top plan view of most of the parts shown in Fig. 16.

Mounted within the main frame 24 near its center and between the two banks of key levers 284 is a stationary cross bar 335 which supports means for guiding and actuating the lower end portions of the links 331 and 332, as shown in Figs. 16, 17 and 18. Fixed to the bar 335 are two rearwardly diverging angular bracket plates 336 and 337 with upright arms 338 which have rearwardly bent apertured ends 339. Fixed to the bar 335 between the plates 336 and 337 is a forwardly projecting bracket plate 340 to support a post 341 on a vertical pivot 342, as seen in Fig. 16. Mounted on a horizontal pivot 343 at the top of the post is a rearwardly extending lever 344 for selectively operating either of the links 331 and 332, this lever being in turn operated by a manually actuated lever 345 to which the thumb piece or ring 301 is connected. The link 332 is guided in the aperture in the end 339 of the bracket 337 and has its lower end bent at right angles to form an arm 346 which underlies the lever 344 in one position of the latter. The other link 331 is similarly guided in the end 339 of the other bracket 336 and has a similar bent arm 347 which also underlies the lever 344 in another position of this lever. The lever 344 not only swings vertically on the pivot 343 but is shiftable laterally on the post pivot 342 so that it may be positioned above either of the arms 346 or 347. The extremities of the opposed arms are downwardly curved so that the lever may be readily shifted for operating one or the other of the arms. The lever 344 is automatically shifted at the end of each travel of the carriage 99 by means associated with the mechanism of Patent No. 2,578,771 and adapted to shift a sliding bar 350 having an upstanding arm 351 with a vertical slot 352 through which the rear end of the lever 344 extends, as seen in Fig. 16. The slidable bar or member 350 extends transversely through bearing openings in the side walls of the frame 24 and its slotted arm 351 is fixed in slidable adjustment by a set screw 353. The arrow printing levers and their links are moved downwardly by the lever 344 against the tension of springs 354. These may be resilient wires fastened at one end at 355 to opposite sides of the plate 340 and having their free ends thrusting against the undersides of the arms 346 and 347, the intermediate portions of the spring arms being guided in slots 356 in the upright portions 338 of the angular bracket plates.

The lever 345 extends in a forward and rearward direction within the lower portion of the main frame, as seen in Fig. 3, its rear end being pivotally connected at 358 to the frame and its front end being pivotally connected at 359 to the depending stem 302 of the thumb ring 301. The front end of the lever 345 is held elevated by a coil spring 360 which has one end fixed to the frame and its other end thrusting against the bottom of the lever. An intermediate portion of the lever 345 is disposed substantially beneath an intermediate portion of the lever 344 so that the two levers may be connected by an upright link 361, as shown in Fig. 16. This link may have right angularly bent ends passed through transverse openings in the levers and retained therein by collars fastened to the projecting ends by set screws. Slidably mounted on the rear portion of the lever 345 and adjustably secured thereto by a set screw, is a collar 362 with a forwardly projecting finger 363 which overlies the cross bar 265, as indicated in Fig. 3. Thus it will be seen that when the ring 301 is pressed downwardly against the tension of spring 360, the lever 345 will pull the link 361 downwardly to move lever 344 downwardly. According to the position of this laterally shiftable lever 344, it will move one or the other of the arms 346 or 347 to cause one or the other of the arrow printing levers to be operated. As the lever 345 is moved downwardly the lip 363 will depress the bar 265 and cause the above described spacing mechanism to be operated.

The means for moving the shiftable rod or bar 350 at the end of each travel of the carriage are shown more particularly in Figs. 8—12, and since such means includes part of the mechanism of Patent No. 2,578,771, the latter will be briefly described. That mechanism automatically rotates the platen for line spacing at each end of the travel of the carriage 99 and is supported on the plate 121 extending forwardly from the bar 25 and a rigid rod 135 extending laterally from the frame 24. A U-shaped bearing 123 supported on those parts, rotatably and slidably receives the square shaft 110 extending from the platen shaft. Between the arms of the bearing is a ratchet wheel 127 having a square hole in its hub to slidably and non-rotatably receive the square shaft 110. The ratchet wheel is intermittently turned for line spacing by a pawl 162 mounted on a vertically swinging pawl carrier 153. The latter includes a hub 140 rotatable on a tubular bearing on one of the arms of the U-shaped support, a lever extending rearwardly from the hub and having the pawl 162 mounted on its front end and a ring or collar 147 having a rearwardly projecting finger 202. The rear end of the lever portion of the pawl carrier unit 153 is normally pulled downwardly by a spring 155 against a stop post 170. Mounted on an extension of the hub 140 is a roller 167 adapted to be lifted by a traveling cam 176 on a bar 175 which extends transversely under the rear portion of the pawl carrier and has one end fixed to the carriage 99 to move therewith. During the travel of the carriage in each direction the cam 176 swings the carrier against the tension of the spring 155 to an elevated position to move the pawl 162 back on the ratchet wheel 127 one or more teeth. The carrier 153 is temporarily held in its elevated position until the carriage is near the end of its travel in one direction or the other, and it is then released so that the pawl will move the ratchet wheel, and hence the platen, as the carrier is pulled down by the spring 155. The tripping device for holding the carrier elevated and for releasing it, comprises a slidable trip finger 199 which moves under the finger 202 on the carrier when the latter is elevated by the cam. The finger 199 is on a slidable trip rod 189 mounted in spaced bearings supported from the plate 121. Coil springs surround the rod 189 and thrust at one end against one of the bearings and at the other end against opposite sides of a block 190 fixed to the rod midway of its bearings. Thus the trip finger 199 may be positioned under the carrier finger 202 and may be moved to either side of the latter to release it, when the rod 189 is moved in one direction or the other. The rod is shifted to release the carrier as the carriage approaches the end of its travel in each direction by stops or trip dogs 178 and 182. These are mounted adjacent opposite ends of the stationary cam carrying bar 175 and they are in line with the slidable rod 189 so that the ends of the latter engage them. Reference may be had to Patent No. 2,578,771 for a more complete disclosure of this mechanism.

The present invention utilizes the downward swinging movement of the pawl carrier 152 to tilt a rockable member 365 which is so connected to the lever shifting bar 350, that the latter will be moved at the end of each travel of the carriage so that the lever 344 will be caused to operate one or the other of the arrow printing levers 327, 328. The rocker 365 comprises a rock shaft 366 supporting a cross bar 367 which may be fixed between its ends in an upright lever arm 368 adjustably fixed to the shaft 366 which extends in a forward and rearward direction. The rear end of this shaft is rotatable in a bearing 369 on the bar 25 and its front end is rotatable in an opening in the rod 135. Adjustably fixed to the shaft 368 is a depending lever arm 370 with its lower end suitably pivoted at 371 to the rod 350. It will be seen that when one or the other ends or arms of the cross bar 367 is depressed the shaft 366 will be rocked to cause the lever 370 to shift the rod 350.

Figures 11, 12, 14:
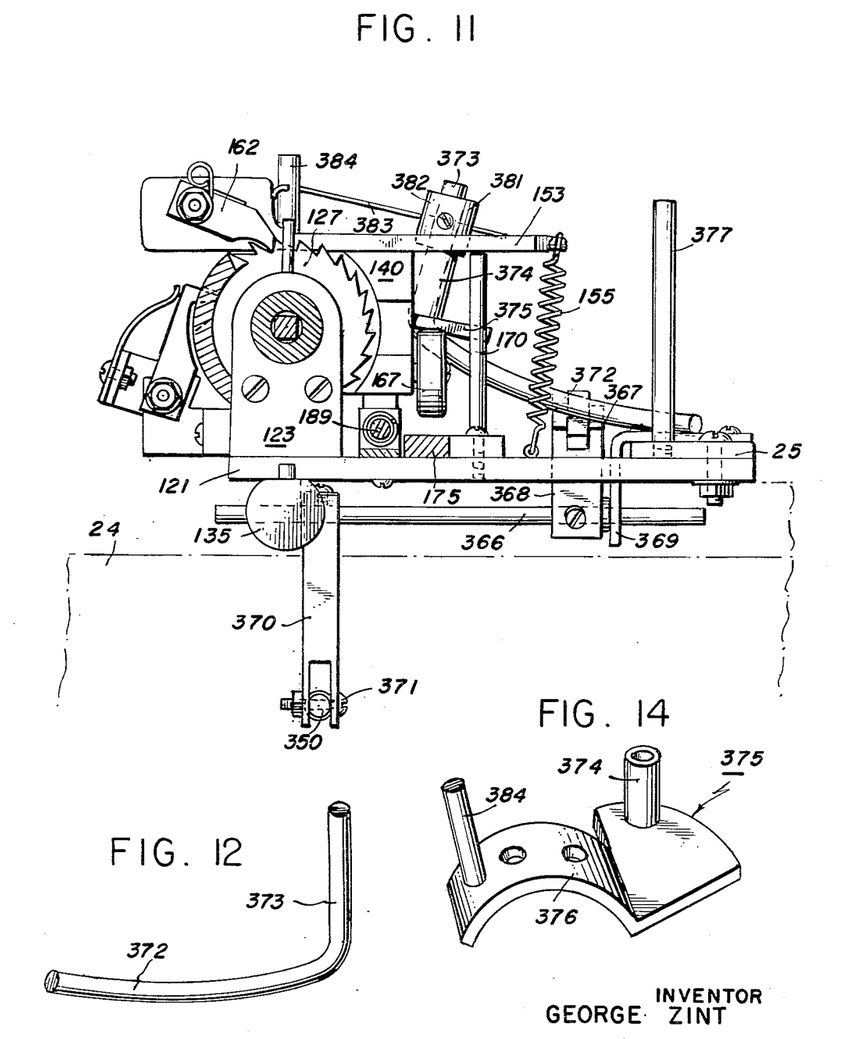
Fig. 11 is a detail cross section taken substantially on the line 11—11 in Fig. 10.
Fig. 12 is a detail perspective view of the swinging arm which is initially moved by the trip members and which actuates the rocker member.
Fig. 14 is a detail perspective view of the plate carrying the bearing for the swinging arm.

The rocker 365 is actuated by a swinging arm 372 which is pivotally mounted on the pawl carrier 153 to swing horizontally so that it may be positioned above either end of the cross bar 367 and which also has vertical swinging movement produced by the swinging of the carrier so that it may be caused to move either end of the cross bar downwardly when the carrier is pulled down by the spring 155. The arm 372 is pivotally mounted by providing its inner end with an upright pivot portion 373 which extends through and is rotatable in a tubular bearing 374 on an attaching plate 375 carried by the carrier 153. As seen in Fig. 14 the plate 375 has an arcuate portion 376 to fit a portion of the periphery of the collar 147 and secured thereto by screws, and a rearwardly and laterally extending portion from which the bearing 374 arises. It will be seen that the swinging arm 372, which has a slight longitudinal curvature, will swing horizontally or laterally on its pivot 373 so that it may be disposed above either end portion of the rocker bar 367 and that it will also swing up and down with the pawl carrier 153, so that when it swings downwardly it will actuate that end of the bar 367 which is beneath it. The arm 372 is limited in its lateral swinging by two stop posts 377 and 378 fixed to the bar 25 and positioned to stop the arm over one end portion or the other of the rocker bar, the arm sliding along the posts in its vertical swinging movements.

Figures 6, 7:
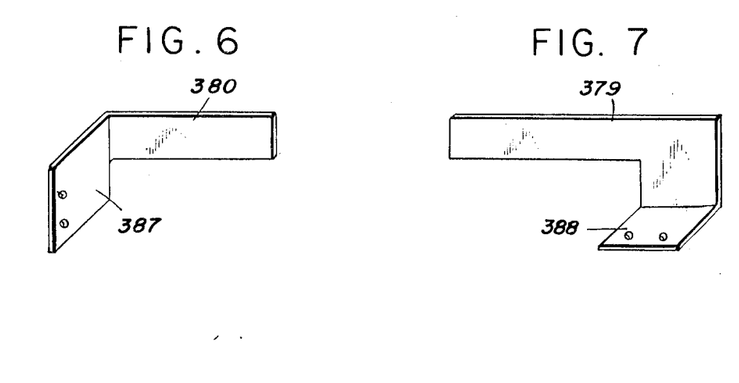
Figs. 6 and 7 are detail perspective views of the two trip members which move with the carriage and which operate parts that cause one or the other of the arrow printing levers to be actuated when the proper thumb ring is depressed.
Figure 8:
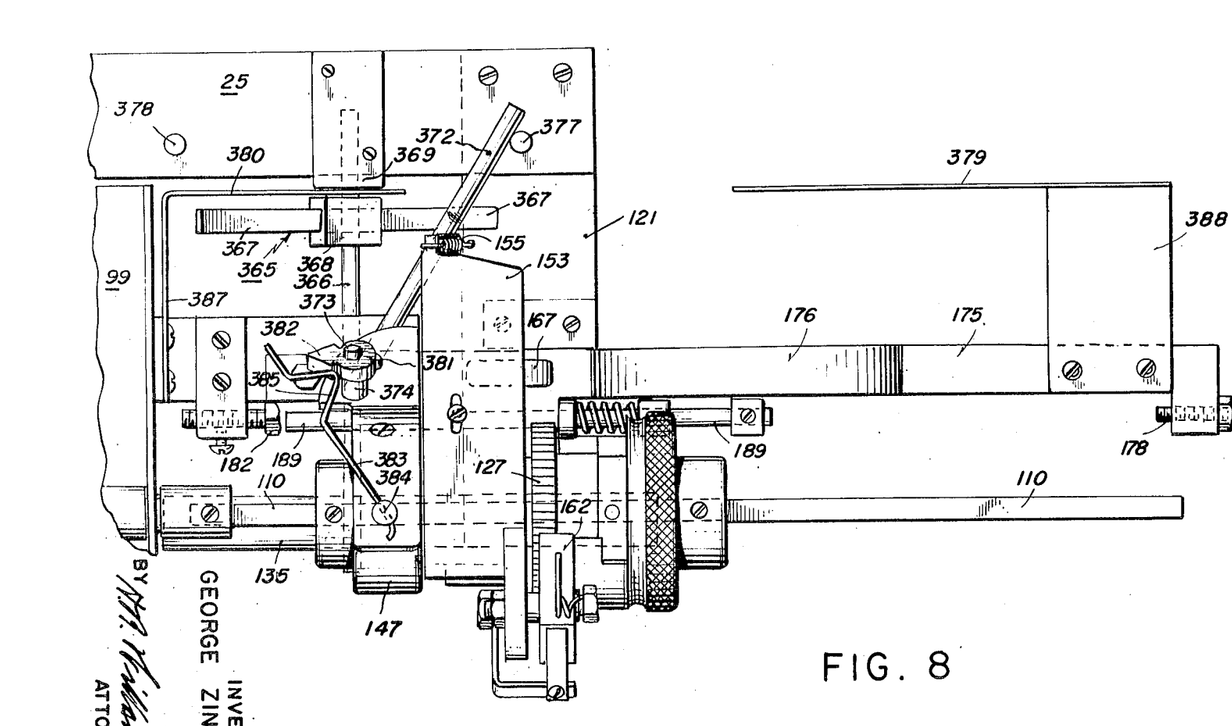
Fig. 8 is a detail top view on an enlarged scale of the parts directly actuated by the two trip members of the carriage when the latter nears each end of its travel.

The arm 372 is spring pressed against each post by a spring device which also causes the arm to be spring actuated in the opposite direction and against the opposite post after it has been moved a predetermined distance away from the post with which it is engaged, the initial swinging movement of the arm being caused by two spaced trip members 379 and 380 that move with the carriage 99. This double acting spring device comprises a hub or collar 381 adjustably fixed by a set screw to the projecting upper end of the pivot 373 and provided with a radially projecting wedge-shaped projection 382, the converging side faces of which are at an angle of 60°. It also comprises a spring arm 383 which coacts with the wedge-shaped or V-shaped projection 382. The spring 383 may be made of resilient wire and have one end adjustably fixed to a post 384 carried by the arcuate portion 376 of the attaching plate. Near the free end of the spring is a V-shaped portion 385 which thrusts against one or the other of the flat sides of the wedge 382 and rides on the engaged face as the wedge swings with the arm 372 until its V-portion passes over the edge of the wedge, whereupon the spring will act against the other side of the wedge to quickly move the latter by a snap action to throw the arm 372 further in the direction in which it was moving and against one of the stop posts. The two trip members 379 and 380 as shown in Figs. 6, 7 and 8, are made of sheet metal and are disposed in longitudinal alinement. Trip 380 is right angular and has an attaching portion 387 suitably fixed to an end portion of the carriage 99. Trip 379 has a right angular attaching portion 388 bolted to the outer end portion of the bar 175 which moves with the carriage. These flat trip plates 379 and 380 are so disposed that their ends will engage the arm 372 when in its raised position and shortly before the carriage reaches the limit of its travel.

Figure 9:
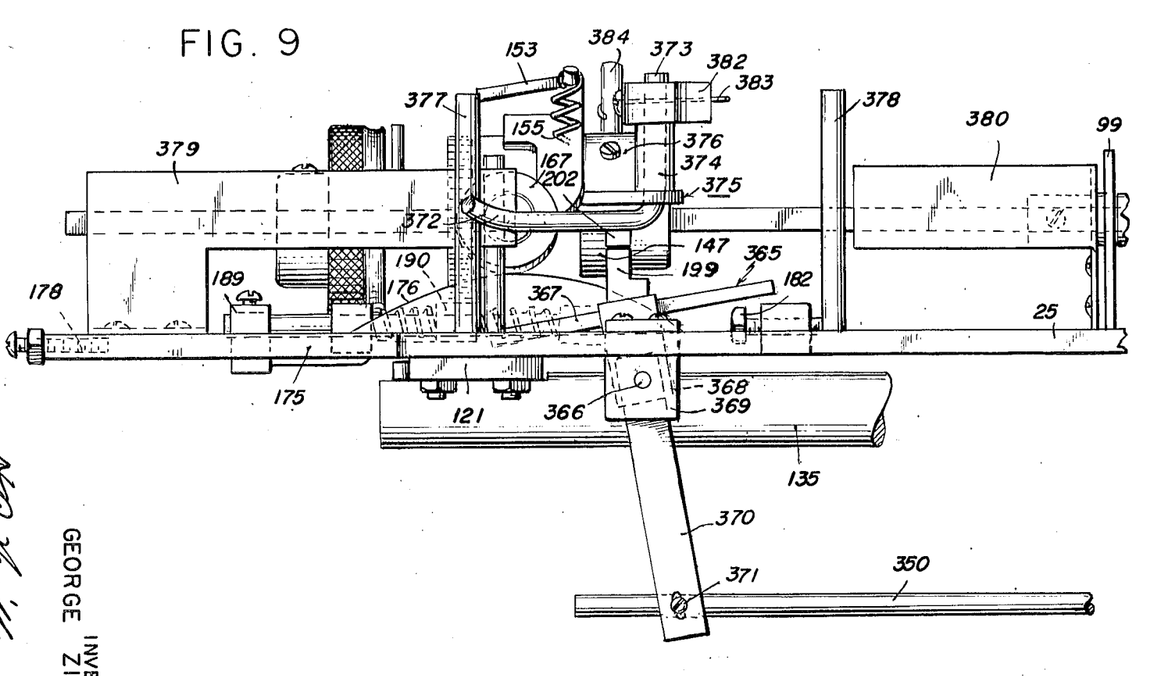
Fig. 9 is a detail rear elevation of the parts shown in Fig. 8.
Figures 10, 13:
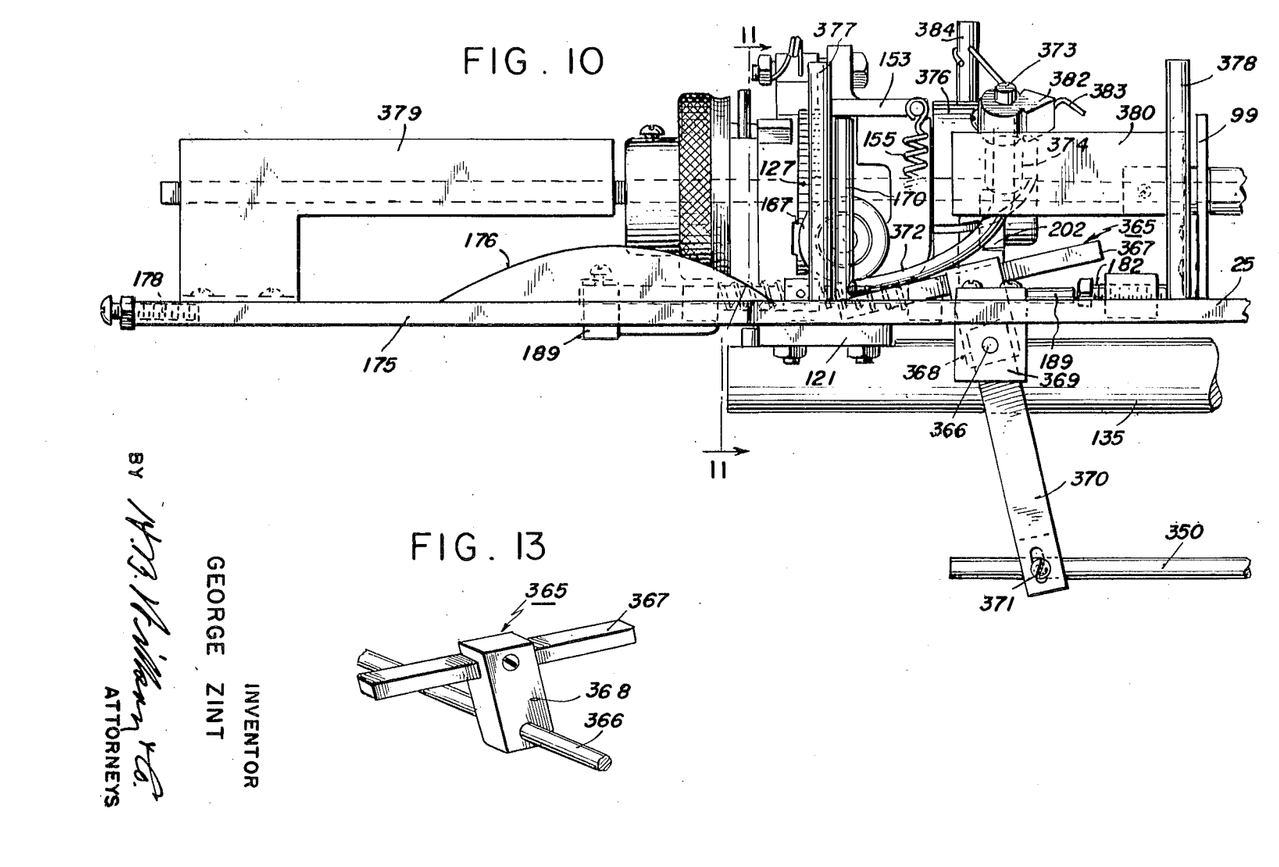
Fig. 10 is a detail view similar to Fig. 9 but showing some of the parts in a different position.
Fig. 13 is a detail perspective view of the rocker member.

While the operation has been set forth in the foregoing description of the mechanism, it will be noted that Figs. 1, 2, 8, 10 and 11 show the parts in the positions they assume when the carriage has started its movement to the left. As the carriage moved to the right the trip 380 pushed the arm 372 away from post 378 until the spring 383 snapped it further to the right and against the post 377 while the arm was in its raised position. Then further movement of the carriage to the right moved the trip 182 against the trip rod 189 until its finger 199 was moved from under the finger 202 on the carrier lever 153, thereby permitting the latter to lower and move the arm downwardly along post 377 until it actuated the rocker 367 and moved it to the position shown in Figs. 1, 8 and 10. In such position of the parts the trip 182 has started to move away from the rod 189. As the carriage continues to travel to the left, the cam 176 lifts the carrier lever to its elevated position where it is held by the finger 199, and before the carriage reaches the end of its travel to the left the trip 379 causes the then elevated arm or actuator 372 to be pushed away from post 377 until the double acting spring device 382, 383 snaps that arm against post 378. When the end of the travel of the carriage to the left is reached, the trip 178 actuates the trip rod 189. In Fig. 9 the actuator or arm 372 is shown held in its elevated position against post 377 and from which it is moved by the trip 379 until the spring device snaps it over against the post 378 so that it is in operative relationship to the raised end of the rocker 365.

Fig. 19 of the drawing shows a reproduction of typewritten matter which I have typed on a machine constructed in accordance with this disclosure. The operator will cause the arrows to be printed at the beginning and ends of sentences and of lines or between words, as he may desire.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a typewriter having a frame supporting two banks of character printing levers operated by key levers and on which the typing is done during each reciprocation of a power driven slidable carriage so that every other line of the typed matter must be read backwards, two additional levers bearing type for printing oppositely facing arrow-like symbols and associated with said banks of printing levers, a manually movable finger piece supported from the typewriter frame, and means actuated by said finger piece to automatically actuate one or the other of said arrow printing levers according to the direction of travel of the carriage, said means comprising an actuator movable in two directions, means controlled by the movement of the carriage for shifting the actuator in one of said directions for selective association with one or the other of said arrow printing levers, said actuator being movable in the other of said directions by said finger piece to cause the selected arrow printing lever to be operated.

2. In a typewriter having a frame supporting two banks of character printing levers operated by key levers and on which the typing is done during each reciprocation of a power driven slidable carriage so that every other line of the typed matter must be read backwards, two additional levers bearing type for printing oppositely facing arrow-like symbols and associated with said banks of printing levers, a manually movable finger piece supported from the typewriter frame, and means actuated by said finger piece to actuate one or the other of said arrow printing levers according to the direction of travel of the carriage, said means including an actuator movable in two directions, said actuator being shiftable in one direction for operative association with one or the other of said arrow printing levers and being movable in the other direction by movement of the finger piece to cause actuation of one or the other of said arrow printing levers, said means also including mechanism actuated at each end of the travel of the carriage to shift said actuator for operative association with one or the other of said arrow printing levers.

3. In a typewriter having a frame supporting two banks of character printing levers operated by key levers and on which the typing is done during each reciprocation of a power driven slidable carriage so that every other line of the typed matter must be read backwards, two additional levers bearing type for printing oppositely facing arrow-like symbols and associated with said banks of printing levers, separate actuating elements for said arrow printing levers, a manually movable finger piece supported from the typewriter frame, a shiftable member for selectively actuating either of said separate actuating elements, said member being movable to and fro in one direction for operative association with one or the other of said elements and being movable in another direction for the actuation of one or the other of said elements, and means actuated by said finger-piece for moving said shiftable member in the last mentioned direction to cause actuation of one or the other of said arrow printing levers.

4. The structure of claim 3 in which said shiftable member is automatically moved for operative association with one or the other of said elements as the sliding carriage approaches each end of its travel.

5. The structure of claim 3 in which said finger piece is a loop to receive the thumb of one hand of the user and is so positioned that the fingers of that hand may reach the key levers usually operated by that hand, when the thumb is engaged with the finger piece.

6. The structure of claim 5 together with a second thumb receiving loop supported from the typewriter frame in laterally spaced relation to the first one to receive the thumb of the other hand of the user and similarly position the fingers of that other hand relative to the remaining key levers.

7. The structure of claim 6 in which the typewriter has spacing mechanism for variable spacing between words and sentences, and in which said second thumb receiving loop is movably supported on the frame and operatively connected to said spacing mechanism to actuate the same.

8. The structure of claim 3 together with means automatically moving said shiftable member into operative association with one or the other of said actuating elements as the sliding carriage approaches each end of its travel, said last mentioned means including a sliding bar operatively associated with said shiftable member, a rocker fulcrumed between its ends and operatively associated with said bar to reciprocate it longitudinally, and means operative as the sliding carriage approaches each end of its travel to cause the rocker to be tilted alternately in opposite directions.

9. The structure of claim 8 in which said last mentioned means for tilting the rocker comprises a laterally swinging arm movable horizontally between two stops which position the arm in operative relationship with respect to one or the other end of the rocker, a vertically swinging lever on which said arm is pivotally mounted, spring means for moving said lever downwardly to cause said arm to actuate one end or the other of the rocker, a double acting spring device associated with the pivot of said arm to yieldably hold the latter against one or the other of its stops until the arm is moved a predetermined distance away from such stop whereupon the arm will be swung against the other stop, spaced stationary trips movable with the carriage and coacting with the arm when the carriage approaches each end of its travel to move the arm the said predetermined distance away from the stop with which it is engaged, a cam moved by the carriage to lift said lever against the tension of its spring during each travel of the carriage, a slidable spring pressed trip to coact with said swinging lever to hold it in elevated position, and spaced tripping dogs moved by the carriage and coacting with said slidable trip to release said lever at the end of each travel of the carriage.

10. The structure of claim 3 in which said carriage carries a rotatable platen together with automatic means for rotating the platen for line spacing at each end of each travel of the carriage, said platen rotating means including a vertically swingable lever spring pressed in a downward direction, and means automatically moving said shiftable member into operative association with one or the other of said actuating elements as the carriage approaches each end of its travel, said last mentioned means including a sliding bar operatively associated with said shiftable member, a rocker fulcrumed between its ends and associated with said bar to reciprocate it longitudinally, a laterally swinging arm movable horizontally between two stops which position the arm in operative relationship with respect to one or the other end of the rocker, a pivot for said arm mounted on said swingable lever whereby when the latter swings downwardly said arm will swing downwardly to actuate one end or the other of the rocker, a double acting spring device associated with the pivot of the arm to yieldably hold the latter against one or the other of its stops until the arm is moved a predetermined distance away from such arm whereupon the arm will be swung against the other stop, and spaced stationary trips movable with the carriage and coacting with the arm when the carriage approaches each end of its travel to move the arm the said predetermined distance away from the stop with which it is engaged.

11. In a typewriter having a frame, two vertically swingable printing levers arranged in opposed relation, an operating link depending from each lever and having a horizontally extending arm, the two arms extending toward each other in substantially the same plane, a stationary support having means for guiding said links, a post carried by the support and mounted on a vertical pivot, a swingable link operating lever having one end mounted on a horizontal pivot on said post, the other end portion of this lever being disposed in a plane above said arms and being shiftable horizontally about the vertical pivot for operative association with either of said arms and being swingable downwardly about the horizontal pivot to actuate the arm beneath it, means for shifting said swingable lever horizontally for selective operation of one or the other of said printing levers, and manually operated means for moving said swingable lever downwardly.

12. The structure of claim 11 in which the last mentioned means comprises a forwardly and rearwardly extending lever within the typewriter frame and having its rear end mounted on a horizontal pivot, a vertically movable finger piece at the front of the frame and operatively connected to the front end of this lever, spring means for actuating this lever in one direction and an upright link operatively connecting this lever with said link operating lever.

13. The structure of claim 11 in which said stationary support comprises a bar extending transversely of the typewriter frame, a bracket extending forwardly from said bar on which said post is pivoted and two rearwardly extending brackets having upright portions with vertical slots and right angularly bent upper ends apertured to receive and guide said links, and spring arms attached at their front ends to the opposite sides of said forwardly extending bracket, and having their rear portions guided in said slots and thrusting upwardly on said arms.

14. The structure of claim 11 in which said means for shifting said link operating lever includes a longitudinally slidable bar mounted in the typewriter frame transversely thereof and disposed beneath the link operating lever, an upstanding arm on said bar with a vertical slot to receive the link operating lever, and means for shifting said bar longitudinally.

15. The structure of claim 14 in which the typewriter has a reciprocatory carriage and said means for shifting said bar is automatically actuated at the end of each travel of the carriage of the typewriter.

References Cited in the file of this patent

UNITED STATES PATENTS 2,449,126  Kirkpatrick ___________ Sept. 14, 1948